(12) United States Patent
Kuo et al.

(10) Patent No.: US 9,413,444 B2
(45) Date of Patent: Aug. 9, 2016

(54) RADIO-FREQUENCY PROCESSING CIRCUIT AND RELATED WIRELESS COMMUNICATION DEVICE

(75) Inventors: Cheng-Hao Kuo, Hualien County (TW); Shao-Chin Lo, Miaoli County (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 14/419,244

(22) PCT Filed: Aug. 3, 2012

(86) PCT No.: PCT/CN2012/079660
§ 371 (c)(1),
(2), (4) Date: Feb. 3, 2015

(87) PCT Pub. No.: WO2014/019223
PCT Pub. Date: Feb. 6, 2014

(65) Prior Publication Data
US 2015/0188617 A1 Jul. 2, 2015

(51) Int. Cl.
*H04B 7/06* (2006.01)
*H04B 7/10* (2006.01)

(52) U.S. Cl.
CPC ............ *H04B 7/0608* (2013.01); *H04B 7/0602* (2013.01); *H04B 7/10* (2013.01)

(58) Field of Classification Search
CPC ...... H04B 7/0602; H04B 1/40; H04B 7/0608; H04W 88/06; H04Q 7/32
See application file for complete search history.

(56) References Cited

U.S. PATENT DOCUMENTS

| 5,175,878 | A | * | 12/1992 | Davis | ...................... | H01Q 3/24 455/103 |
| 5,701,596 | A | * | 12/1997 | Meredith | ................. | H01Q 3/24 455/103 |
| 6,745,046 | B1 | * | 6/2004 | Eckert et al. | ............... | 455/552.1 |
| 7,629,880 | B2 | * | 12/2009 | Stilp | ........................ | G08B 1/08 340/506 |
| 7,636,560 | B2 | * | 12/2009 | Ku | ............................... | 455/272 |

(Continued)

FOREIGN PATENT DOCUMENTS

TW 200941817 10/2009
TW 201225561 A1 6/2012

OTHER PUBLICATIONS

"International Search Report" mailed on May 16, 2013 for International application No. PCT/CN2012/079660, International filing date: Aug. 3, 2012.

*Primary Examiner* — Jean B Corrielus
(74) *Attorney, Agent, or Firm* — Winston Hsu; Scott Margo (57) ABSTRACT

A radio frequency (RF) processing circuit used in a wireless communication device for processing a plurality of wireless signals is disclosed. The RF processing circuit comprises an RF front-end circuit and a control unit. The RF front-end circuit is coupled to a plurality of antennas and a plurality of communication modules and is used for switching connections between the plurality of antennas and the plurality of communication modules according to a control signal. The control unit is coupled to the RF front-end circuit and is used for generating the control signal according to a frequency band and operation conditions of each communication module. The RF front-end circuit further comprises a switch module and a frequency multiplexing module.

16 Claims, 7 Drawing Sheets

(56) References Cited

U.S. PATENT DOCUMENTS

| | | |
|---|---|---|
| 7,751,850 B2 * | 7/2010 | Karaoguz ................. 455/553.1 |
| RE45,528 E * | 5/2015 | Sawai ........................ 375/267 |
| 2006/0153227 A1 * | 7/2006 | Hwang ................ H04L 1/0025 370/465 |
| 2007/0135168 A1 * | 6/2007 | Liu ........................ H01Q 3/40 455/562.1 |
| 2009/0017772 A1 * | 1/2009 | Kemmochi ............ H04B 1/006 455/73 |
| 2009/0243752 A1 | 10/2009 | Hsu |
| 2010/0029218 A1 * | 2/2010 | Alanen et al. .................. 455/75 |
| 2010/0105425 A1 * | 4/2010 | Asokan ..................... 455/552.1 |
| 2010/0177655 A1 * | 7/2010 | Duenyas ..................... 370/252 |
| 2011/0105026 A1 | 5/2011 | Hsiao |
| 2011/0151811 A1 * | 6/2011 | Lagnado et al. .......... 455/150.1 |
| 2011/0249760 A1 * | 10/2011 | Chrisikos et al. ........... 375/259 |
| 2012/0078640 A1 * | 3/2012 | Shirakawa et al. ........... 704/500 |
| 2012/0142295 A1 | 6/2012 | Tseng |
| 2013/0028128 A1 * | 1/2013 | Novak et al. ................ 370/252 |
| 2013/0217342 A1 * | 8/2013 | Abdul-Gaffoor et al. ...... 455/77 |

* cited by examiner

RADIO-FREQUENCY PROCESSING CIRCUIT AND RELATED WIRELESS COMMUNICATION DEVICE

TECHNICAL FIELD

The present invention relates to a radio-frequency (RF) processing circuit and related wireless communication device, and more particularly, to an RF processing unit capable of adjusting transmission of wireless signals according to channel conditions and operation frequency bands.

BACKGROUND

With the advancement of wireless communication, different wireless communication systems have been developed, such as mobile communication system, wireless local area network (WLAN) and wireless personal area network (WPAN). For example, the mobile communication system may be Global System for Mobile Communications (GSM), 3rd Generation (3G) or Long Term Evolution (LTE) or Worldwide Interoperability for Microwave Access (WiMAX), the WLAN may be Wi-Fi, and the WPAN may be Bluetooth. Preferably, the different wireless communication systems operate on different operation frequency bands and use different communication technologies (e.g. modulation, coding and/or ciphering), to avoid mutual interference between wireless signals of the different wireless communication systems. However, some of the wireless communication systems must operate on the same operation frequency band due to limited spectrum resources.

For example, operation frequency bands of Bluetooth (e.g. IEEE 802.15.1) and Wi-Fi (e.g. IEEE 802.11) are on the industrial, scientific medical (ISM) band located around a carrier frequency of 2.4 GHz, and the ISM band is reserved internationally for industrial, scientific and medical applications. Therefore, there may be wireless communication devices using Bluetooth and Wi-Fi on the same operation frequency band at the same time. In this situation, when a wireless signal of Bluetooth or Wi-Fi is transmitted and received via an antenna, a wireless signal of the other must stop to be transmitted and received via the same antenna even though different protocols with different modulations and codings are respectively used for Bluetooth and Wi-Fi. In other words, transmission or reception of the wireless signal of Bluetooth or Wi-Fi occupies the antenna.

In addition, wireless signals of the same communication standards may correspond to different operation frequency bands. For example, the operation frequency bands of Wi-Fi are 2.4 GHz and 5 GHz, and wireless signals corresponding to 2.4 GHz and 5 GHz can contain different data and can perform transmission with different communication device. However, wireless signals corresponding to 2.4 GHz and 5 GHz have to be transmitted or received by one of a plurality of antennas in a conventional wireless communication device. In other words, the wireless signals corresponding to 2.4 GHz and 5 GHz cannot select different antennas according to channel qualities, such as signal-to-noise ratio (SNR) and bit-error-rate (BER), corresponding to the antennas transmitting and receiving the wireless signal. In such a condition, the transmission of the conventional wireless communication device may be inefficient.

Therefore, how to select an antenna for each wireless signal according to the channel qualities and operation frequency bands of each wireless signal has become a topic to be discussed and addressed.

SUMMARY

The present invention disclose a radio-frequency (RF) processing circuit capable of switching connections between communication modules and antennas according to operation conditions of the wireless communication modules and wireless communication device thereof.

The present invention discloses a radio frequency (RF) processing circuit used in a wireless communication device. The RF processing circuit comprises an RF front-end circuit, coupled to a plurality of antennas and a plurality of communication modules for switching connections between the plurality of antennas and the plurality of communication modules according to a control signal; and a control unit, coupled to the RF front-end circuit for generating the control signal according to a frequency band and operation conditions of each communication module; wherein the wireless communication modules which are connected to a same antenna correspond to different frequency bands.

The present invention further discloses a wireless communication device. The wireless communication device comprises a plurality of communication modules; a plurality of antennas, for transmitting or receiving wireless signals of the plurality of communication modules; and a radio-frequency (RF) processing circuit, comprising a radio-frequency (RF) processing circuit, coupled to the plurality of antennas and the plurality of communication modules for switching connections between the plurality of antennas and the plurality of communication modules according to a control signal; and a control unit, coupled to plurality of communication modules and the RF processing circuit for generating the control signal according to the operation conditions of each of the plurality of communication modules; wherein the wireless communication modules which are connected to a same antenna correspond to different frequency bands.

These and other objectives of the present invention will no doubt become obvious to those of ordinary skill in the art after reading the following detailed description of the preferred embodiment that is illustrated in the various figures and drawings.

DETAILED DESCRIPTION

The present invention adjusts connections between wireless communication modules and antennas according to operation frequency bands and operation conditions of each communication module, to improve performance of each communication module and avoid mutual interferences between wireless signals transmitted and received on the same or neighboring operation frequency bands.

Figure 1:
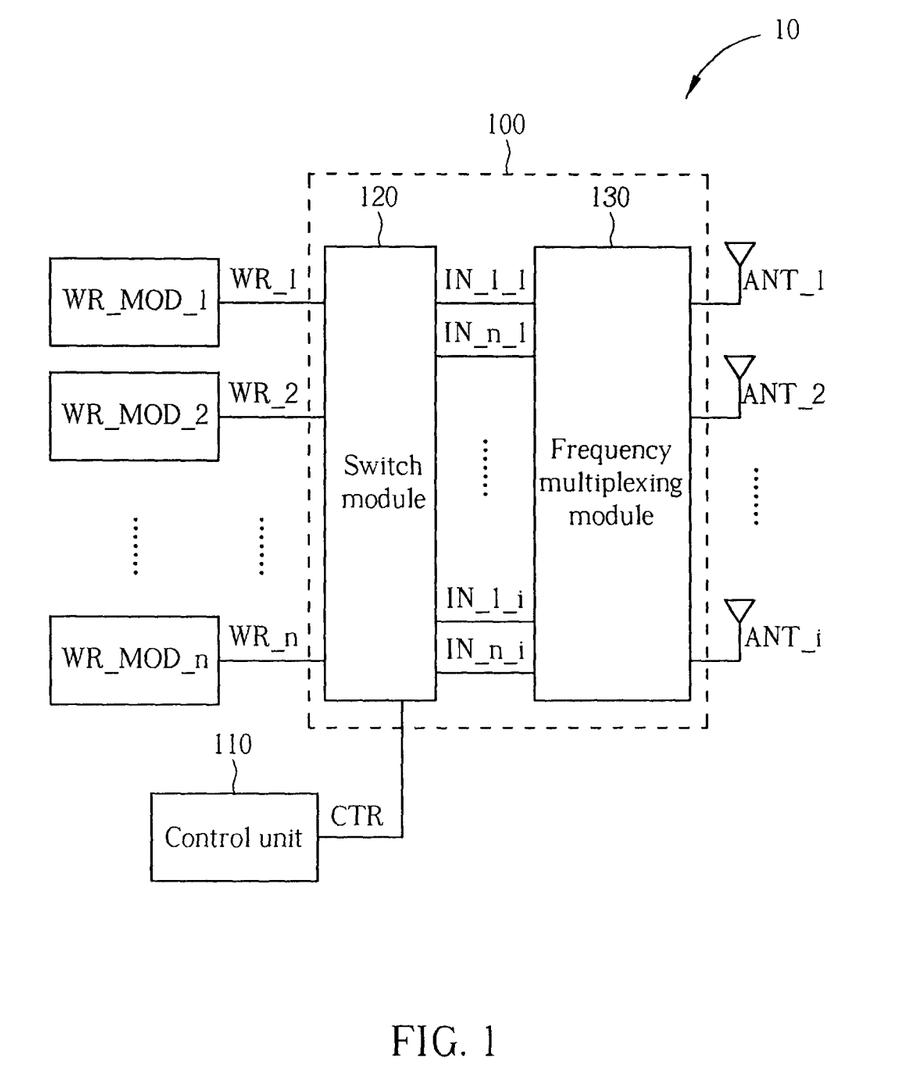
FIG. 1 is a schematic diagram of a wireless communication device according to an embodiment of the present invention.

Please refer to FIG. 1, which is a schematic diagram of a wireless communication device 10 according to an embodiment of the present invention. The wireless communication device 10 is used in an electronic device such as a computer system, a mobile device, etc., and comprises wireless communication modules WR_MOD_1-WR_MOD_n, a radio-frequency (RF) front-end circuit 100, antennas ANT_1-ANT_i, and a control unit 110. The wireless communication modules WR_MOD_1-WR_MOD_n respectively transmit and receive wireless signals WR_1-WR_n via the antennas ANT_1-ANT_i, wherein the wireless signals WR_1-WR_n may correspond to different operation frequency bands and the antennas ANT_1-ANT_i may transmit and receive wireless signals corresponding to different operation frequency bands at the same time. Moreover, at least one of the antennas ANT_1-ANT_i may be a multi band antenna which can transmit and receive signals at multiple different frequencies.

The control unit 110 generates a control signal CTR to the RF front-end circuit 100 for adjusting connections between the wireless communication modules WR_MOD_1-WR_MOD_n and the antennas ANT_1-ANT_i according to the operation frequency bands of the wireless signals WR_1-WR_n and channel qualities corresponding to the antennas transmitting and receiving the wireless signals WR_1-WR_n. In other words, the RF front-end circuit 100 and the control circuit 110 may be integrated as an RF processing circuit. In detail, the control unit 110 firstly adjusts the control signal CTR for detecting the channel qualities corresponding to the antennas ANT_1-ANT_i transmitting and receiving the wireless signals WR_1-WR_n. The control unit 110 then determines the control signal CTR according to detected channel qualities, for connecting each of the wireless communication modules WR_MOD_1-WR_MOD_n with one of the antennas ANT_1-ANT_i, to acquire the best channel qualities for each of the communication modules WR_MOD_1-WR_MOD_n. Note that, the wireless signals corresponding to different operation frequency bands may be connected to the same antenna, and the wireless signals corresponding to the same operation frequency bands are connected to different antennas.

More specifically, the RF front-end circuit 100 comprises a switch module 120 and a frequency multiplexing module 130. The switch module 120 is coupled to the wireless communication modules WR_MOD_1-WR_MOD_n for switching connections between the wireless communication modules WR_MOD_1-WR_MOD_n and input terminals IN_1_1-IN_1_i, IN_2_1-IN_2_i, ... IN_n_1-IN_n_i according to the control signal CTR, wherein the wireless communication module WR_MOD_1 corresponds to the input terminals IN_1_1-IN_1_i, the communication module WR_MOD_2 corresponds to input terminal IN_2_1-IN_2_i, and so on. The frequency multiplexing module 210 is coupled to the switch module 200 and the antennas ANT_1-ANT_i for multiplexing signals between the input terminals IN_1_1-IN_1_i, IN_2_1-IN_2_i, ... IN_n_1-IN_n_i and the antennas ANT_1-ANT_i, wherein the antenna ANT_1 corresponds to the input terminal IN_1_1-IN_n_1, the antenna ANT_2 corresponds to the input terminal IN_1_2-IN_n_2, and so on. As a result, the control circuit 110 can connect each of the wireless communication modules WR_MOD_1-WR_MOD_n to one of the antennas ANT_1-ANT_i via adjusting the control signal CTR according to the channel qualities, such that the wireless communication modules WR_MOD_1-WR_MOD_n transmit and receive the wireless signals WR_1-WR_n through the corresponding antennas to optimize the performances of the communication modules WR_MOD_1-WR_MOD_n.

Figure 2:
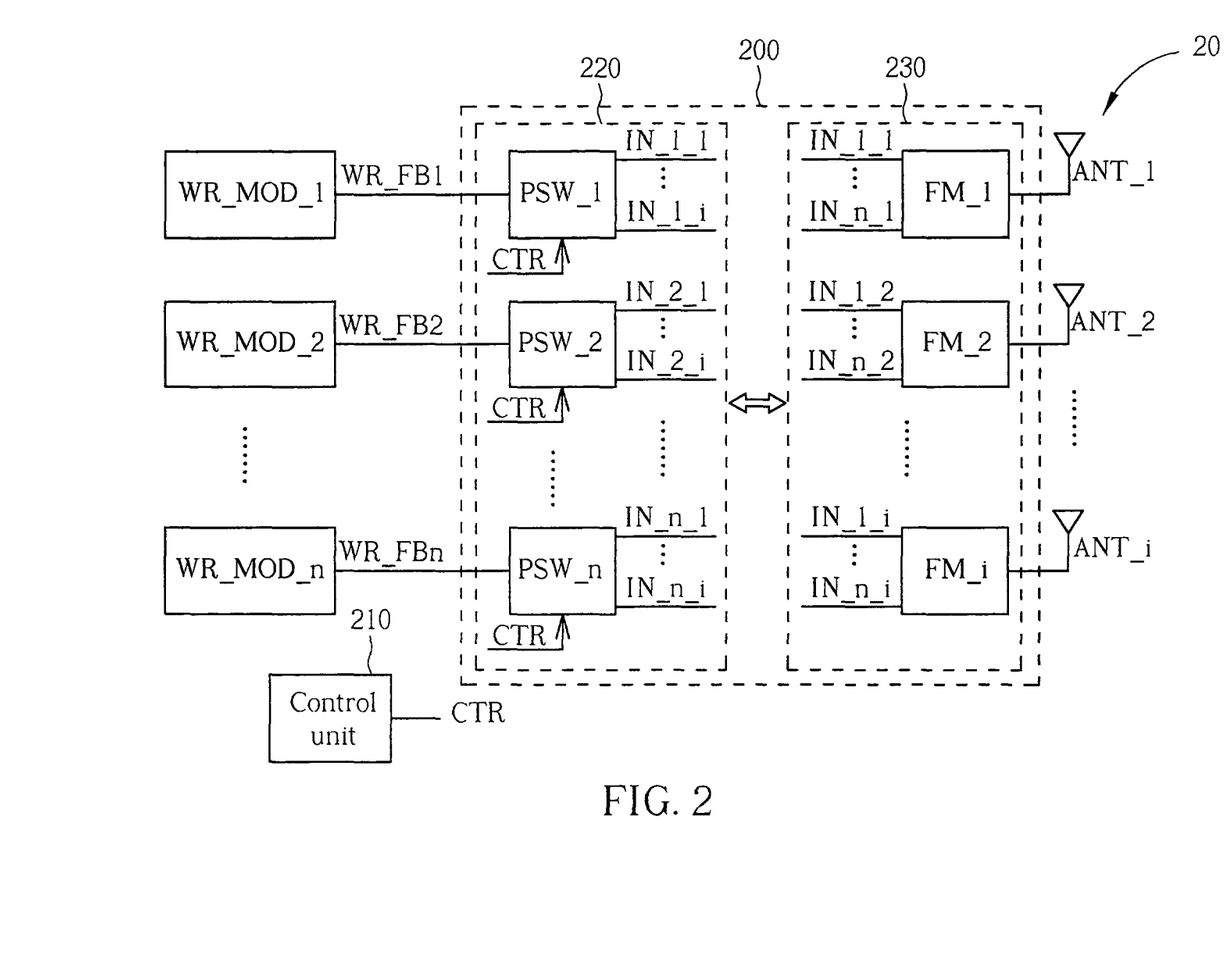
FIG. 2 is a schematic diagram of a communication device according to another embodiment of the present invention.

According to different system requirements, the switch module 120 and the frequency multiplexing module 130 can be appropriately modified. For example, please refer to FIG. 2 which is a schematic diagram of a wireless communication device 20 according to an embodiment of the present invention. The wireless communication device 20 comprises communication modules WR_MOD_1-WR_MOD_n, an RF front-end circuit 200, a control unit 210 and antennas ANT_1-ANT_i. The architecture and operation methods of the wireless communication device 20 are similar to those of the communication device 10 shown in FIG. 1; thus, the same symbols are used. In FIG. 2, a switch module 220 of the RF front-end circuit 200 comprises primary switch units PSW_1-PSW_n. The primary switch unit PSW_1 controls the connections between the wireless communication module WR_MOD_1 and the input terminals IN_1_1-IN_1_i according to the control signal CTR, the switch unit PSW_2 controls the connections between the wireless communication module WR_MOD_2 and the input terminals IN_2_1-IN_2_i according to the control signal CTR, and so on. In this embodiment, each of the primary switch units PSW1-PSW_n is realized by a single-pole i-throw switch, but is not limited herein. A frequency multiplexing module 230 of the RF front-end circuit comprises frequency multiplexing units FM_1-FM_i. Preferably, the frequency multiplexing units FM_1-FM_i are passive units which can automatically multiplex and split wireless signals according to operation frequency bands of the wireless signals. The frequency multiplexing unit FM_1 is coupled to the input terminals IN_1_1-IN_n_1 and the antenna ANT_1, the frequency multiplexing unit FM_2 is coupled to the input terminals IN_1_2-IN_n_2 and the antenna ANT_2, and so on. Since the connections between communication modules WR_MOD_1-WR_MOD_n and the frequency multiplexing units FM_1-FM_i are controlled by the control signal CTR generated by the control circuit 110 according to the channel qualities corresponding to the antennas ANT_1-ANT_i transmitting and receiving the wireless signals WR_FB1-WR_FBn, each of the wireless communication modules WR_MOD_1-WR_MOD_n can be connected to one of the antennas ANT_1-ANT_i for acquiring the best channel qualities.

Figure 3:
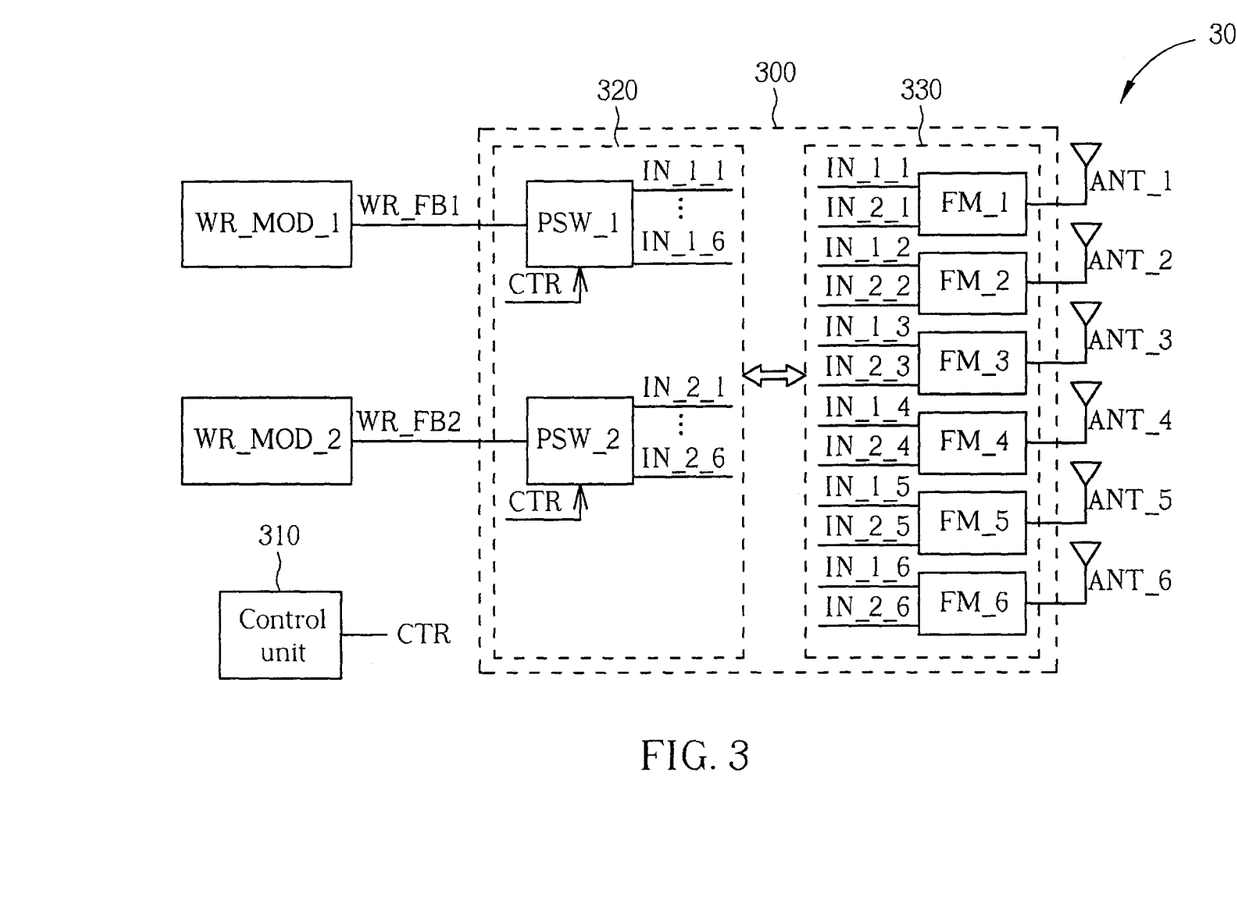
FIG. 3 is a schematic diagram of an implementation method of the wireless communication device shown in FIG. 2

For illustrative purposes of the concept of the embodiment shown in FIG. 2, please refer to FIG. 3, which is a schematic diagram of a wireless communication device 30 according to an embodiment of the present invention. As shown in FIG. 3, the wireless communication device 30 is an example derived from the wireless communication device 20 when n=2 and i=6. Thus, the wireless communication device 30 comprises wireless communication modules WR_MOD_1 and WR_MOD_2, an RF front-end circuit 300, a control unit 310, and antennas ANT_1-ANT_3, wherein the wireless communication modules WR_MOD_1 and WR_MOD_2 respectively corresponds to operation frequency bands FB1 and FB2. A switch module 320 of the RF front-end circuit 300 comprises primary switch units PW_1 and PW_2. The primary switch units PSW_1 and PSW_2 may be a single-pole six-throw switch. A frequency multiplexing module 330 of the RF front-end circuit comprises frequency multiplexing units FM_1 and FM_2. In this embodiment, the frequency multiplexing units FM_1 and FM_2 can be diplexers since the wireless communication device 30 operates in two operation frequency bands.

In detail, the wireless communication modules WR_MOD_1 and WR_MOD_2 respectively generate wireless signals WR_FB1 and WR_FB2 which are corresponding to the operation frequency bands FB1 and FB2. Next, the control unit 310 adjusts the control signal CTR for detecting channel qualities corresponding to the antennas ANT_1-ANT_6 transmitting and receiving the wireless signals WR_1 and WR_2, and then generates the control signal CTR according to the detected channel qualities. The primary switch units PSW_1 and PSW_2 respectively switch the connections between the wireless communication module WR_MOD_1 and the input terminals IN_1_1-IN_1_6, and connections between the wireless communication module WR_MOD_2 and the input terminals IN_2_1-IN_2_6, according to the control signal CTR, for connecting each of the wireless communication modules WR_MOD_1 and WR_MOD_2 to one of the frequency multiplexing units FM_1-FM_6. Then, the frequency multiplexing units FM_1-FM_6 selectively multiplex the wireless signals WR_FB1 and WR_FB2 to the antennas ANT_1-ANT_6. As a result, instead of transmitting by the same antenna, the wireless signals WR_FB1 and WR_FB2 generated by the wireless communication modules WR_MOD_1 and WR_MOD_2 can be transmitted according to the channel qualities corresponding to each of the antennas ANT_1-ANT_6 transmitting and receiving the wireless signals WR_1 and WR_2.

The wireless communication device 10 shown in FIG. 1 can be appropriately modified when taking the operation frequency bands of wireless signals WR_1-WR_n into consideration. Please refer to FIG. 4, which is a schematic diagram of a wireless communication device 40 according to an embodiment of the present invention. The wireless communication device 40 comprises wireless communication modules WR_MOD_1-WR_MOD_n, an RF front-end circuit 400, a control unit 410 and antennas ANT_1-ANT_i. The RF front-end circuit 400 comprises a switch module 420 and a frequency multiplexing module 430. The architecture of the wireless communication device 40 is similar to that of the wireless communication device 20 shown in FIG. 2; thus, the same symbols are used. Similar to the wireless communication device 20 shown in FIG. 2, the frequency multiplexing module 430 comprises frequency multiplexing units FM_1-FM_i for multiplexing signals between the input terminals IN_1_1-IN_k_1, IN_1_2-IN_k_2, ..., IN_1_i-IN_k_i and the antennas ANT_1-ANT_i. Different from the wireless communication device 20 shown in FIG. 2, the wireless signals WR_FB1_1-WR_FB1_1j, WR_FB2_1-WR_FB2_2j, ..., WR_FBk_1-WR_FBk_kj generated by the wireless communication modules WR_MOD_1-WR_MOD_n (n=k×j) are corresponding to operation frequency bands FB1-FBk. Therefore, the switch module 420 shown in FIG. 4 further comprises secondary switch units SSW_1-SSW_m for controlling connections between the wireless signals corresponding to the same operation frequency and the frequency multiplexing units FM_1-FM_i according to the control signal CTR, where m equals a product of the number i of the antennas ANT_1-ANT_i and the number k of the operation frequency bands corresponding to the wireless signals WR_FB1_1-WR_FB1_1j, WR_FB2_1-WR_FB2_2j, ..., WR_FBk_1-WR_FBk_kj (m=i×k). Via the secondary switch units SSW_1-SSW_m, there is only one of the wireless signals corresponding to the same operation frequency band connects to each of the frequency multiplexing units FM_1-FM_i. In other words, the wireless signals corresponding to the same frequency bands would not interfere to each other. As a result, the wireless communication device 40 shown in FIG. 4 can adjust connections between the wireless communication modules WR_MOD_1-WR_MOD_n and the antennas ANT_1-ANT_i according to the operation frequency bands FB1-FBk and the channel qualities corresponding to the antennas ANT_1-ANT_i transmitting and receiving the wireless signals WR_FB1_1-WR_FB1_1j, WR_FB2_1-WR_FB2_2j, ..., WR_FBk_1-WR_FBk_kj.

In detail, after the wireless communication module WR_MOD_1-WR_MOD_n generate the wireless signals WR_FB1_1-WR_FB1_1j, WR_FB2_1-WR_FB2_2j, ..., WR_FBk_1-WR_FBk_kj (n=k×j), the control unit 410 adjusts the control signal CTR for detecting the channel qualities corresponding to each of the antennas ANT_1-ANT_i transmitting and receiving the wireless signals WR_FB1_1-WR_FB1_1j, WR_FB2_1-WR_FB2_2j, ..., WR_FBk_1-WR_FBk_kj, and determines the control signal CTR according to the detected channel qualities. Next, a primary switch units PSW_1 switches connections between the communication modules WR_MOD_1 and the output terminals OUT_FB1_1_1-OUT_FB1_1_i of the primary switch units PSW_1 according to the control signal CTR, a primary switch units PSW_2 switches connections between the communication modules WR_MOD_2 and the output terminals OUT_FB1_2_1-OUT_FB1_2_i of the primary switch units PSW_2 according to the control signal CTR, and so on. Then, the secondary switch unit SSW1 switches connections between the output terminals OUT_FB1_1_1-OUT_FB1_1j_1 and the input terminal IN_1_1 according to the control signal CTR, the secondary switch unit SSW2 switches connections between the output terminals OUT_FB1_1_2-OUT_FB1_1j_2 and the input terminal IN_1_2 according to the control signal CTR, and so on. As a result, the wireless communication device 40 shown in FIG. 4 can connect each of the communication modules WR_MOD_1-WR_MOD_n to one of the antennas ANT_1-ANT_i according to operation frequency bands FB1-FBk and the channel qualities corresponding to the antennas ANT_1-ANT_i transmitting and receiving the wireless signals WR_FB1_1-WR_FB1_1j, WR_FB2_1-WR_FB2_2j, ..., WR_FBk_1-WR_FBk_1j.

Figure 4:
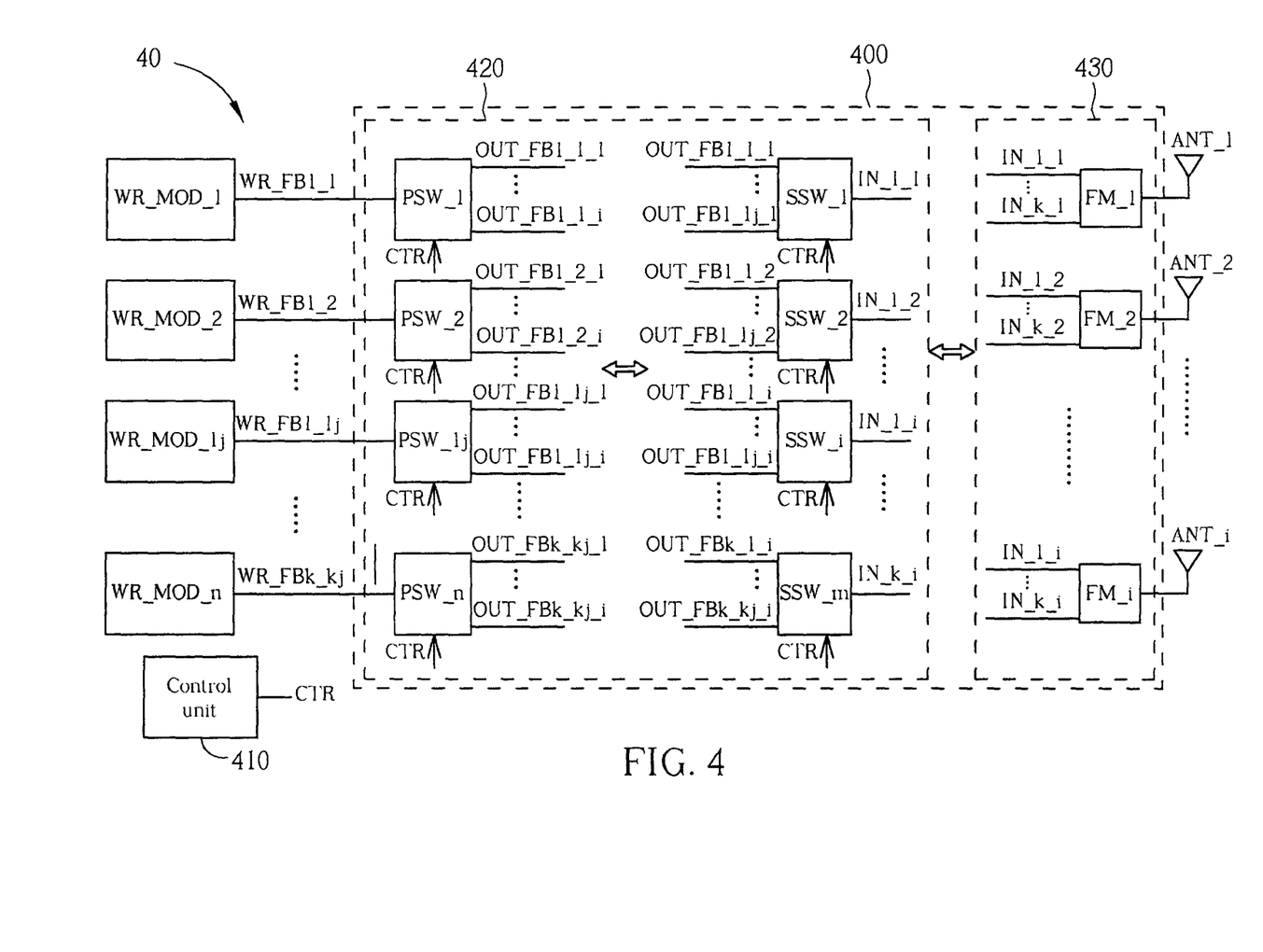
FIG. 4 is a schematic diagram of a wireless communication device according to another embodiment according to an embodiment of the present invention.
Figure 5:
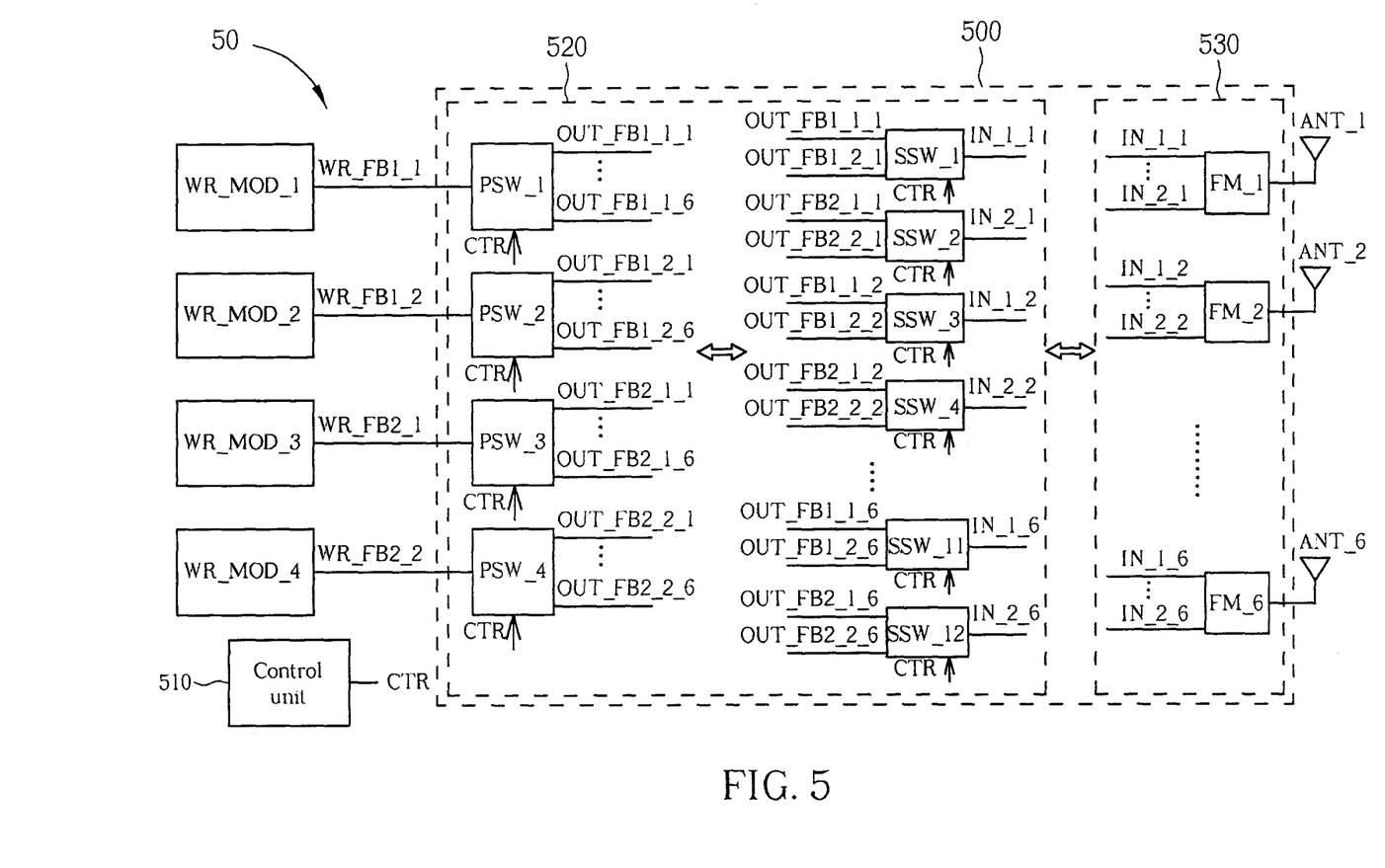
FIG. 5 is a schematic diagram of an implementation method of the wireless communication device shown in FIG. 4.

For illustrative purposes of the concept of the wireless communication device 40 shown in FIG. 4, please refer to FIG. 5, which is a schematic diagram of a wireless communication device 50 according to an embodiment of the present invention. The wireless communication device 50 is an example of the wireless communication device 40 shown in FIG. 4 when k=2, j=2, and i=6. Thus, the wireless communication device 50 comprises wireless communication modules WR_MOD_1-WR_MOD_4, an RF front-end circuit 500, a control unit 510, and antennas ANT_1-ANT_6. A switch module 520 of the RF front-end circuit 500 comprises primary switch units PSW_1-PSW_4 and secondary switch units SSW_1-SSW_12. In this embodiment, the primary switch units PSW_1-PSW_4 are single-pole six-throw switches and the secondary switch units SSW_1-SSW_12 are single-pole double-throw switches. A frequency multiplexing module 530 of the RF front-end circuit 500 comprises frequency multiplexing units FM_1-FM_6. Specifically, wireless signals WR_FB1_1 and WR_FB1_2 outputted by the wireless communication modules WR_MOD_1 and WR_MOD_2 are corresponding to an operation frequency band FB_1 and the wireless signals WR_FB2_1 and WR_FB2_2 outputted by the wireless communication module WR_MOD_3 and WR_MOD_4 are corresponding to an operation frequency band FB_2. Next, the control unit 510 adjusts a control signal CTR for detecting channel qualities corresponding to each of the antennas ANT_1-ANT_6 transmitting and receiving the wireless signals WR_FB1_1, WR_FB1_2, WR_FB2_1 and WR_FB2_2, and then determines the control signal CTR according to the detected channel qualities and the operation frequency bands FB1 and FB2. Note that, the control unit 510 does not select the same antenna for the wireless signals corresponding to the same operation frequency band. According to the control signal CTR, the primary switch units PSW_1-PSW_4 and the secondary switch units SSW_1-SSW_12 of the switch module 200 connect each of the wireless communication modules WR_MOD_1-WR_MOD_4 to one of the frequency multiplexing units FM_1-FM_6, such that the frequency multiplexing units FM_1-FM_6 selectively multiplex the wireless signals WR_FB1_1, WR_FB1_2, WR_FB2_1 and WR_FB2_2 to the antenna ANT_1-ANT_6. Moreover, at least one of the antennas ANT_1-ANT_6 may be a multi band antenna which can transmit and receive signals at multiple different frequencies.

Figure 6:
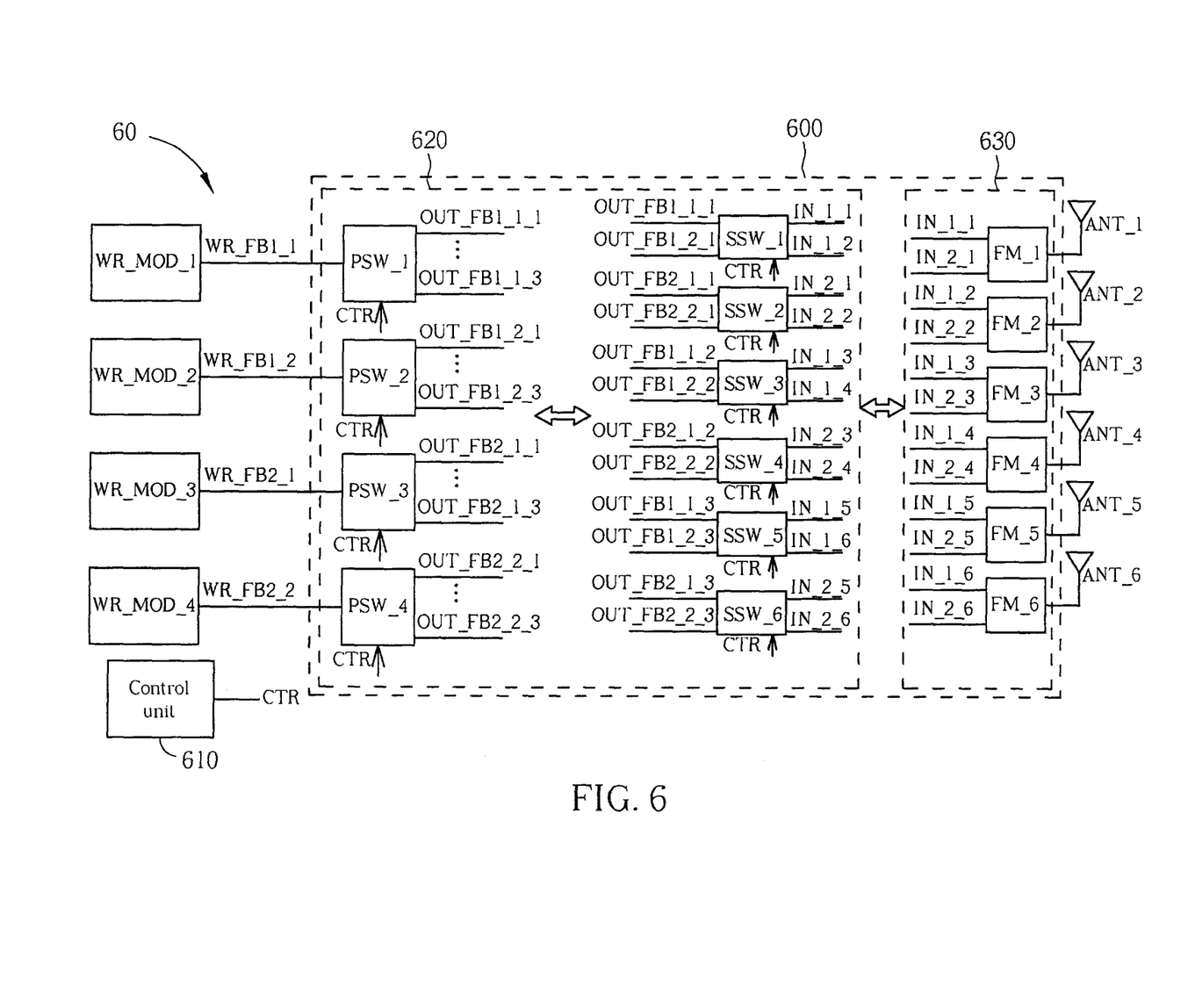
FIG. 6 is a schematic diagram of another implementation method of the wireless communication device shown in FIG. 5.

Noticeably, the above embodiments of the present invention adjust connections between the wireless communication modules and antennas according to the operation frequency bands of the wireless signals and the channel qualities of the antennas transmitting and receiving the wireless signals, to optimize the performances of the wireless communication modules. According to different system requirements, those skilled in the art can observe appropriately modifications and alternations. For example, please refer to FIG. 6, which is a schematic diagram of a wireless communication module 60 according to an embodiment of the present invention. The wireless communication module 60 is an example of the wireless communication device 50 shown in FIG. 5. The architecture of the wireless communication device 60 is therefore similar to that of the communication device 50; thus, the same symbols are used. The differences between the wireless communication device 60 shown in FIG. 6 and the wireless communication device 50 shown in FIG. 5 are the primary switch units PSW_1-PSW_4 are changed from the single-pole six-throw switches to sing-pole three-throw switches. Furthermore, the number of the secondary switch units is reduced from 12 to 6 by replacing the single-pole double-throw switches by double-pole double-throw switches. The detailed operations of the wireless communication device 60 shown in FIG. 6 can be referred to the above, and are not narrated herein for brevity. As can be seen from above, the wireless communication device 60 shown in FIG. 6 halves the number of the secondary switch units and simplifies the architecture of the switch module 520.

Moreover, flexibility and practicality of the RF front-end circuit can be increased with the embodiments of the present invention, if antenna patterns of the antennas are taken into consideration. Please refer to FIG. 7, which is a schematic diagram of a wireless communication device 70 according to an embodiment of the present invention. The wireless communication device 70 comprises wireless communication modules WR_MOD_1-WR_MOD_4, an RF front-end circuit 700, a control unit 710, and antennas ANT_1-ANT_6, wherein the RF front-end circuit 700 comprises a switch module 720 and a frequency multiplexing module 730. The architecture of the wireless communication device 70 is similar to that of the wireless communication device 50 shown in FIG. 5; thus, the same symbols are used. Different from the wireless communication device 50 shown in FIG. 5, the antennas ANT_1-ANT_6 are classified into a first group including antennas ANT_1-ANT_3 and a second group including antennas ANT_4-ANT_6 according to antenna patterns. For example, the antenna pattern of the first group of antennas is suitable for transmitting and receiving wireless signals of vertical polarization and the antenna pattern of the second group is suitable for transmitting and receiving wireless signals of horizontal polarization. Since the antennas ANT_1-ANT_6 are classified into two groups, the switch module 720 is modified to comprise primary switch units PSW_1 and PSW_2 and secondary switch units SSW_1-SSW_4. In this embodiment, the primary switch module PSW1 and PSW2 may be double-pole double-throw (DPDT) switch and the secondary switch SSW_1-SSW_4 may be single-pole three-throw (SP3T) switch. As a result, the wireless communication device 70 can connect the wireless communication modules to a certain group of antennas for transmitting and receiving wireless signals of a specific polarization.

Figure 7:
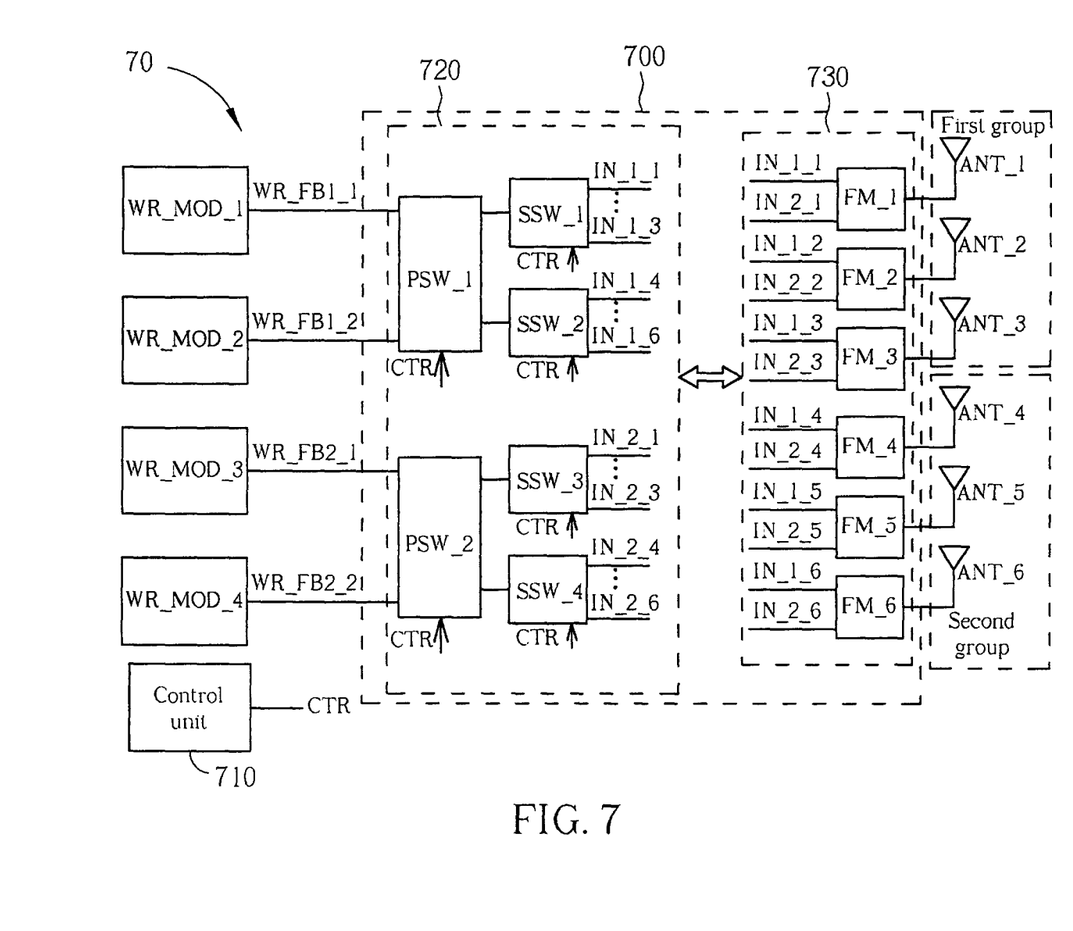
FIG. 7 is a schematic diagram of a wireless communication device according to an embodiment of the present invention.

Specifically, the first group of antennas is coupled to the secondary switch units SSW_1 and SSW_3 through frequency multiplexing units FM_1-FM_3 and the second group of antennas is coupled to the secondary switch units SSW_2 and SSW_4 through the frequency multiplexing units FM_4-FM_6. The wireless communication device 70 switches connections between the wireless communication modules corresponding to the same operation frequency band (i.e. the wireless communication modules WR_MOD_1 and WR_MOD_2, and the wireless communication modules WR_MOD_3 and WR_MOD_4) and the secondary switch units SSW_1-SSW_4 via the primary switch units PSW_1 and PSW_2, to separately connect the wireless communication modules corresponding to the same operation frequency band to one of the two groups of antennas. As a result, the wireless communication device 70 can connect the wireless communication modules to a certain group of antennas for transmitting and receiving wireless signals of a specific polarization. Also, as can be seen from the above, the switch module 720 is further simplified when classifying the antennas ANT_1-ANT_6 into the two groups.

To sum up, via the RF processing unit of the present invention, the wireless communication modules can be independently coupled to the antenna according to channel qualities corresponding to antennas transmitting the wireless signals generated by the wireless communication modules. In other word, the present invention allows each of the wireless communication modules to independently choose the antenna for transmitting and receiving wireless signals, so as to optimize the performance of all the communication modules.

Those skilled in the art will readily observe that numerous modifications and alterations of the device and method may be made while retaining the teachings of the invention. Accordingly, the above disclosure should be construed as limited only by the metes and bounds of the appended claims.

The invention claimed is:

1. A radio frequency (RF) processing circuit used in a wireless communication device, comprising:
   an RF front-end circuit, coupled to a plurality of antennas and a plurality of communication modules for switching connections between the plurality of antennas and the plurality of communication modules according to a control signal; and
   a control unit, coupled to the RF front-end circuit for generating the control signal according to a frequency band and operation conditions of each communication module;
   wherein the RF front-end circuit comprises:
   a frequency multiplexing module, comprising a plurality of frequency multiplexing units, each of the frequency multiplexing units is coupled to one of the plurality of antennas and comprises a plurality of input terminals, each of the frequency multiplexing units is configured for exchanging signals between the plurality of input terminals and corresponding antenna; and a switch module, comprising a plurality of primary switch units, each of the primary switch units comprises a plurality of primary output terminals and each of the primary switch units is coupled to one of the plurality of communication modules and is configured for switching connections between corresponding communication module and the plurality of the frequency multiplexing units according to the control signal;

wherein the switch module further comprises:

a plurality of secondary switch units, each of secondary switch units couples to the frequency multiplexing module and the plurality of primary switch units for switching connection between the plurality of primary output terminals and the plurality of input terminals;

wherein the primary output terminals of each of the plurality of primary switch units respectively correspond to each of the plurality of antennas and the primary output terminals coupled to the same secondary switch unit correspond to the same frequency band.

2. The RF processing circuit of claim 1, wherein the control unit generates the control signal according to channel qualities of each communication module corresponding to each antenna.

3. The RF processing circuit of claim 1, wherein at least two wireless communication modules are coupled to a same antenna corresponding to different frequency bands.

4. The RF processing circuit of claim 1, wherein one of the antennas is a multi band antenna.

5. A radio frequency (RF) processing circuit used in a wireless communication device, comprising:

an RF front-end circuit, coupled to a plurality of antennas and a plurality of communication modules for switching connections between the plurality of antennas and the plurality of communication modules according to a control signal; and a control unit, coupled to the RF front-end circuit for generating the control signal according to a frequency band and operation conditions of each communication module;

wherein the RF front-end circuit comprises:

a frequency multiplexing module, comprising a plurality of frequency multiplexing units, each of the frequency multiplexing units is coupled to one of the plurality of antennas and comprises a plurality of input terminals, each of the frequency multiplexing units is configured for exchanging signals between the plurality of input terminals and corresponding antenna; and a switch module, comprising a plurality of primary switch units, each of the primary switch units comprises a plurality of primary output terminals and each of the primary switch units is coupled to one of the plurality of communication modules and is configured for switching connections between corresponding communication module and the plurality of the frequency multiplexing units according to the control signal;

wherein the switch module further comprises:

a plurality of secondary switch units, each of secondary switch units couples to the frequency multiplexing module and one of the plurality of primary switch units for switching connection between the plurality of primary output terminals and the plurality of input terminals;

wherein the input terminals coupled to the same secondary switch unit correspond to a group of antennas.

6. The RF processing circuit of claim 5, wherein the control unit generates the control signal according to channel qualities of each communication module corresponding to each antenna.

7. The RF processing circuit of claim 5, wherein at least two wireless communication modules are coupled to a same antenna corresponding to different frequency bands.

8. The RF processing circuit of claim 5, wherein one of the antennas is a multi band antenna.

9. A wireless communication device, comprising:

a plurality of communication modules;

a plurality of antennas, for transmitting or receiving wireless signals of the plurality of communication modules; and a radio-frequency (RF) processing circuit, comprising:

a radio-frequency (RF) front end circuit, coupled to the plurality of antennas and the plurality of communication modules for switching connections between the plurality of antennas and the plurality of communication modules according to a control signal; and a control unit, coupled to plurality of communication modules and the RF front end circuit for generating the control signal according to the operation conditions of each of the plurality of communication modules;

wherein the RF front-end circuit comprises:

a frequency multiplexing module, comprising a plurality of frequency multiplexing units, each of the frequency multiplexing units is coupled to one of the plurality of antennas and comprises a plurality of input terminals, and each of the frequency multiplexing units is configured for exchanging signals between the plurality of input terminals and corresponding antenna; and a switch module, comprising a plurality of primary switch units, each of the primary switch units comprises a plurality of primary output terminals and each of the primary switch units is coupled to one of the plurality of communication modules and is configured for switching connections between corresponding communication module and the plurality of frequency multiplexing units according to the control signal;

wherein the switch module further comprises:

a plurality of secondary switch units, each of secondary switch units couples to the frequency multiplexing module and the plurality of primary switch units for switching connection between the plurality of primary output terminals and the plurality of input terminals;

wherein the primary output terminals of each of the plurality of primary switch units respectively correspond to each of the plurality of antennas and the primary output terminals coupled to the same secondary switch unit correspond to the same frequency band.

10. The wireless communication device of claim 9, wherein the control unit generates the control signal according to channel qualities of each communication module corresponding to each antenna.

11. The wireless communication device of claim 9, wherein at least two wireless communication modules is coupled to a same antenna corresponding to different frequency bands.

12. The wireless communication device of claim 9, wherein one of the antennas is a multi band antenna.

13. A wireless communication device, comprising:

a plurality of communication modules, a plurality of antennas, for transmitting or receiving wireless signals of the plurality of communication modules; and a radio-frequency (RF) processing circuit, comprising:

a radio-frequency (RF) front end circuit, coupled to the plurality of antennas and the plurality of communication modules for switching connections between the plurality of antennas and the plurality of communication modules according to a control signal; and a control unit, coupled to plurality of communication modules and the RF front end circuit for generating the control signal according to the operation conditions of each of the plurality of communication modules;

wherein the RF front-end circuit comprises:

a frequency multiplexing module, comprising a plurality of frequency multiplexing units, each of the frequency multiplexing units is coupled to one of the plurality of antennas and comprises a plurality of input terminals, and each of the frequency multiplexing units is configured for exchanging signals between the plurality of input terminals and corresponding antenna; and a switch module, comprising a plurality of primary switch units, each of the primary switch units comprises a plurality of primary output terminals and each of the primary switch units is coupled to one of the plurality of communication modules and is configured for switching connections between corresponding communication module and the plurality of frequency multiplexing units according to the control signal;

wherein the switch module further comprises:

a plurality of secondary switch units, each of secondary switch units couples to the frequency multiplexing module and one of the plurality of primary switch units for switching connection between the plurality of primary output terminals and the plurality of input terminals;

wherein the input terminals coupled to the same secondary switch unit correspond to a group of antennas.

14. The wireless communication device of claim 13, wherein the control unit generates the control signal according to channel qualities of each communication module corresponding to each antenna.

15. The wireless communication device of claim 13, wherein at least two wireless communication modules is coupled to a same antenna corresponding to different frequency bands.

16. The wireless communication device of claim 13, wherein one of the antennas is a multi band antenna.

* * * * *